United States Patent [19]

Memmer et al.

[11] Patent Number: 4,557,977

[45] Date of Patent: Dec. 10, 1985

[54] POLYVINYLIDENE FLUORIDE COATINGS

[75] Inventors: Timothy I. Memmer, Strongsville; Peter T. Abel, Berea, both of Ohio

[73] Assignee: SCM Corporation, New York, N.Y.

[21] Appl. No.: 645,279

[22] Filed: Aug. 29, 1984

[51] Int. Cl.[4] .......................... B05D 1/36; B05D 7/00; B32B 27/00; C08L 61/00

[52] U.S. Cl. .................................... 428/421; 427/409; 427/379; 428/463; 524/520; 525/199; 525/200

[58] Field of Search ............... 427/409, 379; 428/421, 428/422, 463; 524/520; 525/199, 200

[56] References Cited

U.S. PATENT DOCUMENTS

| | | | |
|---|---|---|---|
| 4,297,447 | 10/1981 | Yasuda | 525/108 X |
| 4,311,755 | 1/1982 | Rummel | 428/422 X |
| 4,314,004 | 2/1982 | Stoneberg | 427/407.1 X |
| 4,383,075 | 5/1983 | Abel | 524/520 X |
| 4,400,487 | 8/1982 | Stoneberg et al. | 525/200 X |
| 4,463,038 | 7/1984 | Takeuchi et al. | 427/409 X |

*Primary Examiner*—Michael R. Lusignan
*Attorney, Agent, or Firm*—A. Joseph Gibbons

[57] ABSTRACT

A solvent-born coating composition and process for wet-on-wet application to a metal substrate comprises a fluorocarbon resin, an acrylic resin, and various flow modifiers such as benzoguanamine resins, blocked isocyanates or polymeric urethanes. Such coatings used as a primer composition in conjunction with a fluorocarbon-containing topcoat impart improved corrosion resistance, substrate and intercoat adhesion and improved edge pullaway properties.

8 Claims, No Drawings

POLYVINYLIDENE FLUORIDE COATINGS

BACKGROUND OF THE INVENTION

The invention relates to improved coatings for metal substrate for exterior building products and to fluorocarbon solvent-borne primers and topcoats. In the manufacture of exterior building products, fluorocarbon-containing topcoats have become desirable due to their exterior durability with respect to chalk resistance and color retention. Acrylic resins, both thermoplastic and thermoset, add a measure of corrosion resistance to such coatings. As these components are varied in the topcoat it becomes necessary to modify the primer coat accordingly. Various approaches have been made to produce primers for use in conjunction with fluorocarbon topcoats. Polymers dispersed in organic solvents are disclosed in U.S. Pat. Nos. 3,340,222 and 3,324,069. Stoneberg (U.S. Pat. No. 4,314,004) teaches a process for using a pigmented, high fluorocarbon resin with an acrylic resin as an undercoat to a clear fluorocarbon/acrylic topcoat. U.S. Pat. No. 4,297,447 (Yasuda) teaches flexible coatings having a fluorocarbon in combination with (a) a thermosetting resin from the group epoxy resin, alkylphenol resin and polyurethane resin and with (b) a rubbery elastomer from the class of nitrile rubber, chloroprene rubber and thermoplastic polyurethane rubber. U.S. Pat. No. 4,379,885, (Grunewalder and Miller), similarly use primer compositions consisting essentially of polyepoxide resin in conjunction with an acrylic and fluorocarbon resin. Vasta (U.S. Pat. Nos. 3,784,506 and 3,859,123) teach polyvinylidene coatings based on epoxy and aminoplast resin. Abel (U.S. Pat. No. 4,383,075) teaches aqueous thermoset coatings comprising fluorocarbons, hydroxyl or carboxyl containing high Tg acrylics and melamine resin crosslinkers.

As seen by the above citations conventional fluorocarbons generally contain substantial amounts of epoxy resin in combination with the fluorocarbon and acrylic resin. While providing excellent durability, the art compositiom on have several disadvantages such as poor corrosion resistance, excessive ultra-violet transmission, and poor intercoat and substrate adhesion. In addition and for economy purposes, a process which eliminates the primer bake-cure step is desired. Such disadvantages have now been overcome by the non-epoxy containing fluorocarbon compositions of the present invention which can be applied as a primer or topcoat in a wet-on-wet process.

BRIEF SUMMARY OF THE INVENTION

One object of the invention, which relates to novel one-bake coating systems for external building products, is to provide a non-epoxy solvent-based primer coating composition comprising an admixture in an organic medium of (1) from 10 to 50% polyvinylidene fluoride polymer (2) 1% to 30% of a flow modifier and (3) 20 to 89% of one or more acrylic polymers or copolymers; said flow modifier selected from the group consisting of benzoguanamine, a latent or blocked isocyanate or a polymeric urethane; and wherein said acrylic polymer is a thermoplastic acrylic but can preferably contain reactive groups capable of participating in a cross-linking type reaction with a minor amount of added cross-linking agent, if desired.

Another object is a process for coating exterior building substrate with a one-bake wet-on-wet system comprising a fluorocarbon topcoat and the above described solvent-based primer wherein the finished substrate exhibits good corrosion resistance and intercoat and substrate adhesion while maintaining resistance to ultraviolet.

Another object is a non-chalking, durable and corrosion resistant substrate coated with the above composition and a process for coating steel and aluminum building components for exterior application.

DETAILED DESCRIPTION OF THE INVENTION

The essential components of the solvent-borne coating composition, i.e. the fluorocarbon resin, one or more acrylic resin and a flow control agent, are selected in weight proportion (basis total resin) to attain the desired degree of substrate intercoat adhesion, corrosion resistance and application properties. The resin components can be used in amounts of up to 50 weight percent solids, the remainder being solvent components and other typical additives.

The acrylic polymers and copolymers are present in amounts ranging from 20 to 89 percent based on total resin solids and preferably from about 40 to about 60 percent. Increasing the acrylic resin content improved corrosion resistance, and appearance and reduces the overall coating costs. Such acrylic polymers and copolymers are those not having free reactive groups, such as hydroxy, carboxylate, or amide groups, and thus typically are not capable of direct cross-linking reactions. These acrylics are referred to generally as thermoplastic resins. Also useful and preferred for extrusion coating purposes are the acrylic polymers and copolymers having reactive functionality, such as for example, hydroxyl carboxyl and amide reactive groups, which contribute to cross-linking reactions either with the flow modifier or with added cross-linkers such as for example, melamine type cross-linking agents.

Useful acrylic polymers, well known in the art and commercially available, include polymers and copolymers prepared from acrylic and methacrylic monomers such as the acids, esters either alone or in conjunction with one or more monoethylenically unsaturated monomers. For thermoplastic acrylics, the reactants will have no functional groups that would provide reactive sites for a formal cross-linking reaction such as that produced by the addition of cross-linking agents and catalysts. When the acrylic resin is a thermoset, the polymers will be prepared from monomers sufficient to supply the necessary hydroxyl, carboxyl and/or amide functionality adapted for cross-linking purposes. Useful functional acrylates used to form acrylic copolymer include those prepared from acrylic or methacrylic acid and aliphatic alcohols, such as for example, the alcohols: 2-hydroxyethyl; 3-hydroxypropyl; 4-hydroxybutyl; mono and diethylene glycols; and their halo-substituted derivatives. Useful monomers for providing amide functionality include acrylamide, methacrylamide N-methyl methacrylamide, N-(isobutoxymethyl)acrylamide and the like. Where polymers having acid functionality are required the monomer mixture can include from about 0.5 to 15 weight percent (basis total acrylic polymer) an an acid monomer including diacids, unsaturated diacids and acrylic acid or methacrylic acid.

The fluorocarbon resin content (weight percent basis total polymer) can vary from 10% to 50% and preferably from 20% to 40% by weight. High levels provide greater resistance to ultra-violet degradation and greater intercoat adhesion but adversely affect corrosion resistance. Suitable fluorocarbons are primarily based on polyvinylidene fluoride polymers being linear thermoplastic high molecular weight polymers produced by copolymerization of unsaturated vinylidene fluoride monomer to provide repeating polymer units of $(CH_2\text{--}CF_2)n$, such as a homopolymer known as "Kynar", a trademark of Pennwalt Corporation. Fluorocarbon polymers can further include high molecular weight copolymers of primarily polymerized vinylidene fluoride monomer with minor amounts of other fluorine monomers such as tetrafluoroethylene, trifluoroethylene, chlorotrifluoroethylene, and the like. The most preferred fluorocarbon is polyvinylidene fluoride.

The third essential component of the primer composition is the flow modifier which is used in amounts, basis total resin solids, of from about 1% to about 30% (weight percent) and preferably from 5 to 20 percent. The flow modifiers are necessary to improve the application properties of the primer composition and specifically to reduce or eliminate the "edge pullaway". By 'edge pullaway' is meant the disadvantageous mobility of the coating which results in the exposure of bare metal or primed only edge during flash off and/or baking.

Advantageous flow modifiers include nitrogen and amino containing organic monomers or polymers having multiple NH or $NH_2$ or $+N$ sites and specifically the aminoplast resin type compositions. These include, for example, guanamines, substituted guanamines and benzoguanamines, latent or blocked isocyanates and polymeric ureas. Specific modifiers include for example, benzoguanamine (2,4-diamino-6-phenyl-s-triazine), and especially their reaction products with formaldehyde and various alcohols containing up to 4 carbon atoms. Preferred modifiers are the partially or fully alkylated benzoguanamine-formaldehyde resins available from American Cyanamide under the "Cymel" trademark as exemplified in "Cymel 1123". Also contemplated as flow modifiers are specific glycoluril compositions such as butoxymethyl glycoluril (Cymel 1170).

Useful latent or blocked isocyanates as flow control agents are derived from a variety of commercial organic isocyanate compounds including as for example toluene diisocyanates, bis(4-isocyanotoethyl)methane, xylene diisocyanate and the like. Preferred blocked isocyanates are the cycloaliphatic poly isocyanates derived from isophorone diisocyanate. A preferred composition having no free isocyanate group is B-1370 produced by Chemische Werkehüls.

Useful urea aldehyde resins as flow modifiers include the reaction products of urea with formaldehyde and lower alkyl alcohols. Preferred urethanes include polyester urethanes prepared from hydrogenated bisphenol A, dimethylolpropionic acid, adipic acid and toluene diisocyanate and the polyurethanes described in U.S. Pat. Nos. 2,412,054 and 3,759,873.

Although amine aldehyde resins and methylated and ethylated benzoguanamine resins are known for use as cross-linking agents for polymers containing carboxyl, hydroxyl or amide groups such as epoxy, alkyl and acrylic resins, they apparently do not function in that capacity in the present invention since such functional polymers are not essential to the performance as flow control components to develop superior edge pull or crawling. Similarly, the preferred systems do not contain or require the catalysts, usually acid type catalysts needed to assist in conventional cross-linking cure reactions.

It is necessary to effect a balancing between the fluorocarbon, acrylic resin and flow modifier depending on the amount of pigmentation, the particular substrate and line conditions (bake temperature of composite coating) and the composition of the topcoat. The advantageous compositions of the present invention exhibit excellent adhesion, corrosion resistance, ultra-violet resistance and allow a wet-on-wet application with superior "edge pullaway" characteristics.

The primer can be applied either as a clear or pigmented film. Pigmentation, when required may include conventional inorganic and/or organic pigments including but not limited to titanium dioxide, silica, talc, mica, metal carbonates, metal sulphates, chromates, phospho silicate composites, baro silicate composites, calcium silicate composites, aluminum triphosphates, zinc phospho oxides, barium metabarate, zinc molybdate and other non-conventional pigments including synthetic pigments such as plastic pigments, polystyrene and the like. Thus a pigmented coating may contain a pigment to binder ratio of 0.05–1.5 but preferably from 0.5 to 1.0.

Minor levels of other conventional additives can be included in the primer or topcoat such as for example stabilizers, suspending and coalescing agents, lubricants, ultra-violet light absorbers, plasticizers, surfactants, defoamers and the like.

The primer composition is formulated by mixing or dissolving the resin components with an organic carrier solvent at concentrations of from 15 to 60 percent solids (by weight) and can be applied to various substrates using conventional techniques as for example, spray, roll coating, brush, flow coating, and dipping. Spray application is preferred. The formulation can be modified somewhat to accommodate roller coating as practiced in the art. The primer solvent or carrier, can be selected from a wide variety of organic liquids including for example, aromatic petroleum distillates, alcohols, ketones, esters, glycols, glycol ethers. The solvent system is necessary to provide a continuous uniform film on the substrate which will flash or dry at room temperature in 3 to 20 minutes and will deposit a film thickness of from about 0.05 to about 1.0 mils and preferably 0.2 to 0.4 mil thickness.

The primer coat may be baked to a peak metal temperature of up to 450° F. before application of the topcoat; it is preferred for economy to flash dry only and eliminate any primer baking step.

The preferred coating method is the spray application of primer, followed by spray application of the topcoat before curing the system with an oven bake or an infrared heat cycle. Such processes are known as wet-on-wet application. In this manner the fluorocarbon and other components of the primer fuse with those of the topcoat to form a tough uniform protection to the metal or other substrate. Typical cure temperatures for the composite coating are from about 350° to 480° F. Baking time (minutes) will usually vary with the line speed and with the bake temperature. As shown in the examples, satisfactory coatings are produced at 450° F. for 15 minutes. It will be recognized that when thermoplastic acrylic resins are used alone, the resultant baked coatings will not give extended solvent resistance properties as evidenced in the MEK rub test. When solvent resistance is required then use of thermosetting acrylic resins will be indicated. Use of acrylic monomers having hydroxyl, carboxyl and/or amide functionality in conjunction with additional cross-linking agents, i.e. melamine, glycoluril, etc., will increase solvent resistance properties of the cured film. Such thermosetting compositions often require cross-linking reagents and cure catalysts in addition to the film modifier component. Various cross-linking agents are known to the art which effect cure by reaction with the active hydrogen portion of the resin. These include the glycolurils, melamines such as for example hexabutoxymethyl melamine (Cymel 1156), and others including guanamines and benzoguanamines.

The resulting cured film is substantially free of isolated fluorocarbon polymer particles and provides excellent application, durability, adhesion and corrosion resistance on metal substrates and other desirable film properties. These advantages are further illustrated in the following examples. Unless otherwise indicated all parts and percentages are by weight and all temperatures are given in degrees Fahrenheit.

EXAMPLES 1-4

Solvent based primer compositions comprising fluorocarbon resin, acrylic polymer, and flow modifiers were produced by blending together the following components in the order indicated:

|  | 1 | 2 | 3 | 4 |
|---|---|---|---|---|
| Thermoplastic acrylic resin (40% solids)[1] | 452.5 | 452.5 | 452.5 | 633.5 |
| Diacetone alcohol | 289.6 | 289.6 | 289.6 | 289.6 |
| Titanium dioxide | 108.6 | 108.6 | 108.6 | 108.6 |
| Barium sulfate | 181.0 | 181.0 | 181.0 | 181.0 |
| Strontium chromate | 36.2 | 36.2 | 36.2 | 36.2 |
| Xylene | 72.4 | 24.2 | 35.1 | — |
| Polyvinylidene fluoride[2] | 108.6 | 108.6 | 108.6 | 108.6 |
| Flow modifier |  |  |  |  |
| Benzoguanamine (100% solids)[3] | 72.4 | — | — | — |
| Blocked Isocyanate (60% solids)[4] | — | 120.5 | — | — |
| Urethane (66%)[5] | — | — | 109.7 | — |

[1]Acryloid B-44 (Rohm and Haas)
[2]Kynar 500 (Pennwalt)
[3]Cymel 1123 (American Cyanamide)
[4]B-1370 (Huls)
[5]A polyester urethane made from hydrogenated bisphenol A, dimethylolpropionic acid, adipic acid, and toluene diisocyanate having an acid value of 34 basis total weight.

The above primer compositions are applied to chromate pretreated 4"×12" aluminum panels by mixing two parts primer with one part xylene by volume and spraying onto the panels. The panels are allowed to flash for 7 minutes at room temperature, then are topcoated by spraying with a fluorocarbon topcoat containing 70% Kynar 500 and 30% acrylic resin. The panels are allowed to flash for 10 minutes and then baked for 15 minutes at 450° F. Finished coatings having a primer dry film thickness of 0.2 to 0.4 mil and a topcoat dry film thickness of about 1.0 mil. The panels were evaluated for edge pullaway with the results indicated in Table I. Example 1 exhibited no edge pullaway while Examples 2 and 3 exhibited only slight pullaway when compared to Example 4 which contained no flow modifier.

TABLE I

| Example No. | 1 | 2 | 3 | 4 |
|---|---|---|---|---|
| Edge pullaway (inches) | none | 1/32 | 1/32 | 1/8-5/16 |

The coated panels were further evaluated for adhesion, humidity resistance, and salt spray resistance. Examples 1-4 show: (1) no loss of adhesion either to substrate or to primer when taped over a cross-hatched area; (2) no blistering or loss of adhesion after 240 hours exposure to 140° F. condensing humidity; (3) no more than 1/16 inch creep at the scribe or cut edge, and no more than a few #8 blisters in the field after 3000 hours exposure to 5% salt spray. In contrast, the corrosion performance of an unprimed (topcoat only) panel exhibited extensive corrosion with up to ½ inch creep at the cut edge and scribe. Further improvements in corrosion performance may be realized with the use of an acrylic polymer with hydroxyl, carboxyl, and/or amide functionality.

EXAMPLES 5-7

Solvent based primer compositions comprising fluorocarbon resin, acrylic polymer, and benzoguanamine were produced by blending together the following components:

|  | 5 | 6 | 7 |
|---|---|---|---|
| Thermoset acrylic resin[6] (40% solids) | 686.0 | 600.2 | 428.7 |
| Xylene | — | 34.3 | 102.9 |
| Titanium dioxide | 102.9 | 102.9 | 102.9 |
| Barium sulfate | 171.5 | 171.5 | 171.5 |
| Diethyl glycol monoethyl ether acetate | 68.6 | 68.6 | 68.6 |
| Polyvinylidene fluoride[2] | — | 34.3 | 102.9 |
| Benzoguanamine[3] | 68.6 | 68.6 | 68.6 |

[6]An acrylic resin made from methyl methacrylate, ethyl acrylate, hydroxypropyl methacrylate, and acrylic acid in the mole ratio of 19.9/16.5/1.7/1.1; Acid value 37.

The coatings of Examples 5-7 were applied in the same manner as were Examples 1-4. The coated panels were artificially weathered using the apparatus and procedure described in ASTM G-23-81. Differences in intercoat adhesion were exhibited by the topcoat's loss of adhesion to the primer at various lengths of exposure. Table II list the number of hours of exposure at which intercoat adhesion failure was exhibited. The lack of solvent resistance (MEK rubs less than 5) indicates that the flow control agent does not substantially act to effect crosslinking. As shown in the tables, the coatings of Examples 1 and 7 exhibit superior intercoat adhesion (2000 hours to failure) and superior edge pullaway properties.

TABLE II

| Example No. | 5 | 6 | 7 |
|---|---|---|---|
| Hours exposure to intercoat adhesion failure | 300 | 700 | >2000 |
| Edge pullaway (inches) | — | — | none |
| MEK Resistance (number of rubs to failure) | L5 | L5 | L5 |

What is claimed is:
1. A solvent-borne composition for application to exterior building product substrate comprising on a resins solids basis:
   a. from 10% to 50% of a fluorocarbon resin
   b. from 20% to 89% of an acrylic resin c. from 1% to 30% of a flow modifier; said modifier selected from the group consisting of benzoguanamine resin, a blocked isocyanate or a polymeric urethane and wherein a+b+c total 100 percent.

2. The composition of claim 1 wherein the fluorocarbon is a polyvinylidene fluoride; the acrylic resin is a thermoplastic acrylic polymer or copolymer and the flow modifier is a partially alkylated benzoguanamine.

3. The product of claim 1 wherein the acrylic resin is a thermoset acrylic or copolymer and the composition optionally contains an added crosslinking agent in addition to the said flow modifier.

4. A process for applying a non-chalking, wear resistant and corrosion resistant coating to a metal substrate which comprises the following steps:
   a. applying to a cleaned metal substrate an organic solvent-borne primer coat comprising on a resins solids basis:
      (1) from 10% to 5% of a fluorocarbon resin
      (2) from 20% to 89% of an acrylic resin
      (3) from 1% to 30% of a flow modifier; said modifier selected from the group consisting of benzoguanamine resin, a blocked isocyanate or a polymeric urethane and wherein a+b+c totals 100 percent
   b. flashing off a substantial portion of the organic solvent without stoving
   c. applying a fluorocarbon containing topcoat
   d. flashing and baking the composite coating at a temperature of from about 350° F. to about 480° F. sufficient to cause the primer coat and the topcoat to cure to an uniform protective film on said substrate.

5. The process of claim 4 wherein the primer contains a polyvinylidene fluoride in admixture with a thermoplastic acrylic polymer and said flow modifier is a partially alkylated benzoguanamine.

6. The process of claim 4 wherein the acrylic resin in the primer is a thermosetting acrylic polymer having reactive hydroxyl or carboxyl functionality and wherein said primer additionally contains a crosslinking agent reactive with said functionality to cure said composite coating.

7. A metal substrate coated with the composition of claim 1.

8. A metal substrate coated by the process of claim 4.

* * * * *

UNITED STATES PATENT AND TRADEMARK OFFICE
CERTIFICATE OF CORRECTION

PATENT NO. : 4,557,977
DATED : Dec. 10, 1985
INVENTOR(S) : Timothy I. Memmer and Peter T. Abel It is certified that error appears in the above-identified patent and that said Letters Patent are hereby corrected as shown below:

<u>Column 7, line 19</u>

Claim 4a.(1), line 7: "5%" should read --50%--.

Signed and Sealed this

Twenty-third Day of September 1986

[SEAL]

Attest:

DONALD J. QUIGG

Attesting Officer    Commissioner of Patents and Trademarks